(12) United States Patent
So

(10) Patent No.: US 8,693,339 B2
(45) Date of Patent: Apr. 8, 2014

(54) LDP EXTENSION FOR FORWARDING PATH CONGESTION NOTIFICATION

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 651 days.

(21) Appl. No.: 12/634,906

(22) Filed: Dec. 10, 2009

(65) Prior Publication Data

US 2011/0141891 A1 Jun. 16, 2011

(51) Int. Cl.
*H04L 1/12* (2006.01)

(52) U.S. Cl.
USPC .......................................... 370/237; 370/236

(58) Field of Classification Search
USPC ................ 370/216, 217, 221, 225, 229, 230, 370/230.1, 231, 235, 236, 237, 238
See application file for complete search history.

(56) References Cited

U.S. PATENT DOCUMENTS

| | | | |
|---|---|---|---|
| 7,394,811 B2 * | 7/2008 | Gibson et al. ................. | 370/392 |
| 7,489,695 B1 * | 2/2009 | Ayyangar ....................... | 370/396 |
| 2003/0137978 A1 * | 7/2003 | Kanetake ....................... | 370/386 |
| 2005/0220096 A1 * | 10/2005 | Friskney et al. ............... | 370/389 |
| 2006/0114916 A1 * | 6/2006 | Vasseur et al. ................. | 370/397 |
| 2006/0146696 A1 * | 7/2006 | Li et al. .......................... | 370/218 |
| 2007/0195698 A1 * | 8/2007 | Briscoe et al. ................. | 370/235 |
| 2009/0268614 A1 * | 10/2009 | Tay et al. ....................... | 370/236 |

OTHER PUBLICATIONS

Andersson et al. "LDP Specification", Network Working Group, Request for Comments: 3036, http://www.ietf.org/rfc/rfc3036.txt, The Internet Society, 2001.

* cited by examiner

*Primary Examiner* — Edan Orgad
*Assistant Examiner* — Curtis A Alia

(57) ABSTRACT

A system includes an ingress node, an egress node, and one or more intermediate nodes. A path is formed from the ingress node to the egress node via the one or more intermediate nodes, where the path carries label distribution protocol (LDP) packets of an LDP traffic flow. One of the intermediate nodes detects traffic congestion, modifies one of the LDP packets to include an indicator of the traffic congestion, and sends the modified LDP packet towards the egress node. The egress node receives the modified LDP packet and notifies the ingress node of the traffic congestion in response to identifying the indicator of the traffic congestion within the modified LDP packet.

22 Claims, 11 Drawing Sheets

LDP EXTENSION FOR FORWARDING PATH CONGESTION NOTIFICATION

BACKGROUND INFORMATION

The label distribution protocol (LDP) is a protocol used to distribute labels in a multiprotocol label switching (MPLS) environment. LDP relies on the underlying routing information to forward label packets. LDP is used for signaling best-effort label switched paths (LSPs). LDP has no traffic engineering capability. In other words, LDP has no concept of bandwidth or congestion.

The industry is gradually moving towards the direction of converged packetized optical networks using MPLS transport profile (MPLS-TP), such as generalized MPLS (GMPLS). MPLS-TP uses the resource reservation protocol-traffic engineering (RSVP-TE) signaling protocol to set up LSPs. MPLS-TP LSPs are traffic engineering capable (e.g., include concepts of bandwidth and congestion). MPLS-TP LSPs are the transport layer LSPs and carry all types of traffic, including upper layers, such as MPLS RSVP-TE traffic (which is traffic engineering capable) and LDP traffic (which is not traffic engineering capable). It is common for a single MPLS-TP LSP to carry both types of upper layer traffic simultaneously.

The MPLS-TP LSP has finite bandwidth, but the traffic carried on the MPLS-TP can change throughput and bandwidth requirements at any time, through signaling for TE-enabled traffic, or just transmitting more traffic for non-TE-enabled traffic, such as LDP traffic. This can cause traffic congestion on the MPLS-TP if some traffic is not pre-empted from the MPLS-TP LSP.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation, described herein, may provide an LDP extension that facilitates congestion notification in an MPLS network. For example, a node, which detects congestion on an LSP, may add an indicator of traffic congestion to LDP packets that the node transmits on the LSP. An egress node, that receives an LDP packet with an indicator of traffic congestion, may identify the ingress node associated with the LSP and send, to the ingress node, a congestion notification message so that the ingress node may determine whether to pre-empt the LDP packet flow.

Figure 1:
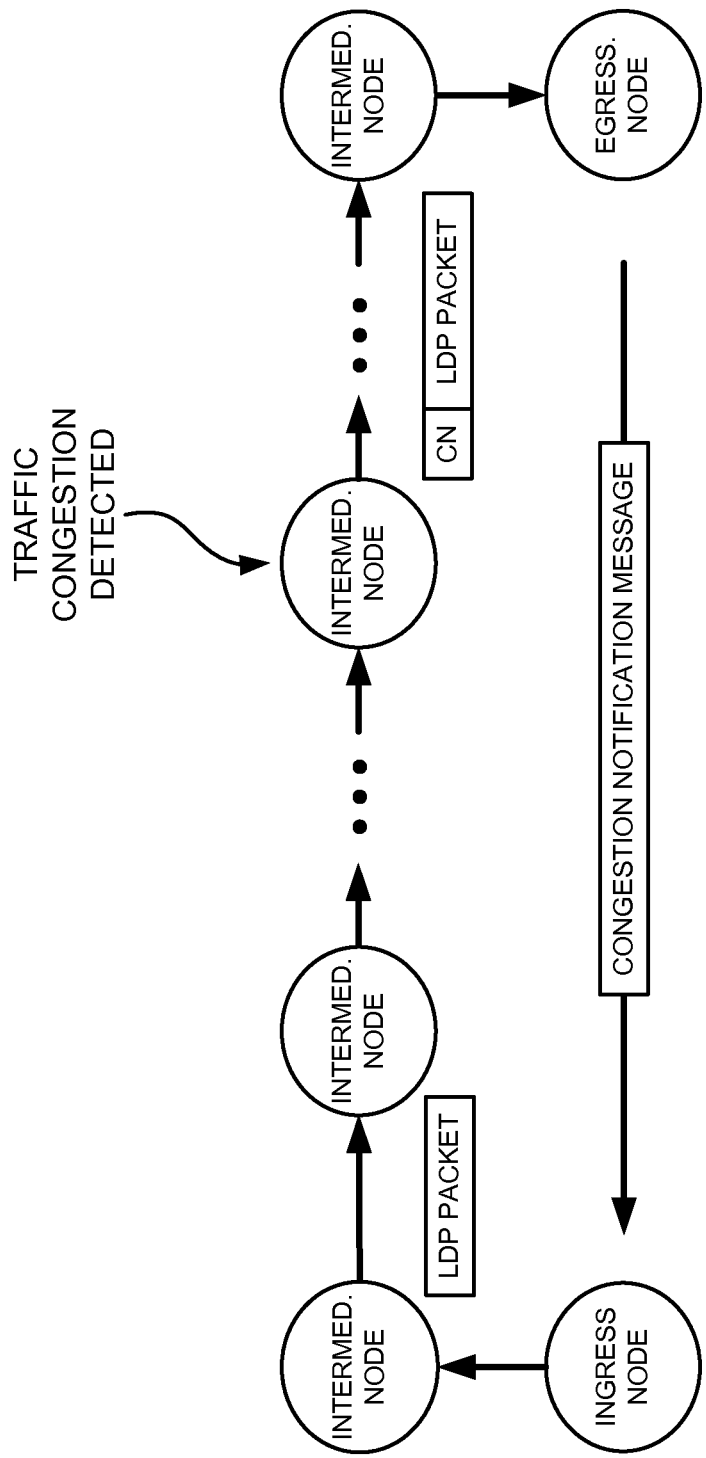
FIG. 1 is a diagram of an overview of an implementation described herein.

FIG. 1 is a diagram of an overview of an implementation described herein. As shown in FIG. 1, assume that an LSP in a network includes an ingress node, a set of intermediate nodes, and an egress node. The ingress node and the egress node may represent the end points of the LSP.

The ingress node may send data traffic on the LSP towards the egress node. Assume that the data traffic, transmitted on the LSP, includes a first traffic flow that is traffic engineering capable (e.g., including RSVP-TE packets) and a second traffic flow that is not engineering capable (e.g., including LDP packets). The first and second traffic flows may share bandwidth on the LSP. The first traffic flow may use a known amount of bandwidth and the second traffic flow may use a variable, unknown amount of bandwidth. Due to the variable nature of the second traffic flow, congestion may occur on the LSP when the second traffic flow uses more bandwidth than is available to the second traffic flow.

If an intermediate node detects traffic congestion, the intermediate node may add an indicator of traffic congestion (shown as CN in FIG. 1) in one or more LDP packets that the intermediate node sends to the egress node. The intermediate node cannot notify the ingress node of the traffic congestion because the intermediate node does not know the identity of the ingress node. Rather, the intermediate node knows how to transmit packets to the egress node.

The egress node may receive an LDP packet with an indicator of traffic congestion. The egress node may extract the indicator of traffic congestion and identify the ingress node associated with the LSP. The egress node may identify the ingress node using, for example, information that the egress node stores regarding the LSP. The egress node may generate a congestion notification message. The congestion notification message may indicate, to the ingress node, that congestion has been detected on the LSP. The egress node may send the congestion notification message to the ingress node. The egress node may send the congestion notification message via the same set of nodes, or via a different set of nodes, than the nodes that the LDP packet traversed from the ingress node to the egress node.

The ingress node may receive the congestion notification message and may determine a course of action. In one implementation, the ingress node may do nothing in response to the congestion notification message. In this case, packets, on the LSP, may be dropped due to the traffic congestion on the LSP. In another implementation, the ingress node may pre-empt the second traffic flow. For example, the ingress node may perform a new shortest path calculation to identify a new path to the egress node. The ingress node may move the second traffic flow to the new path.

Figure 2:
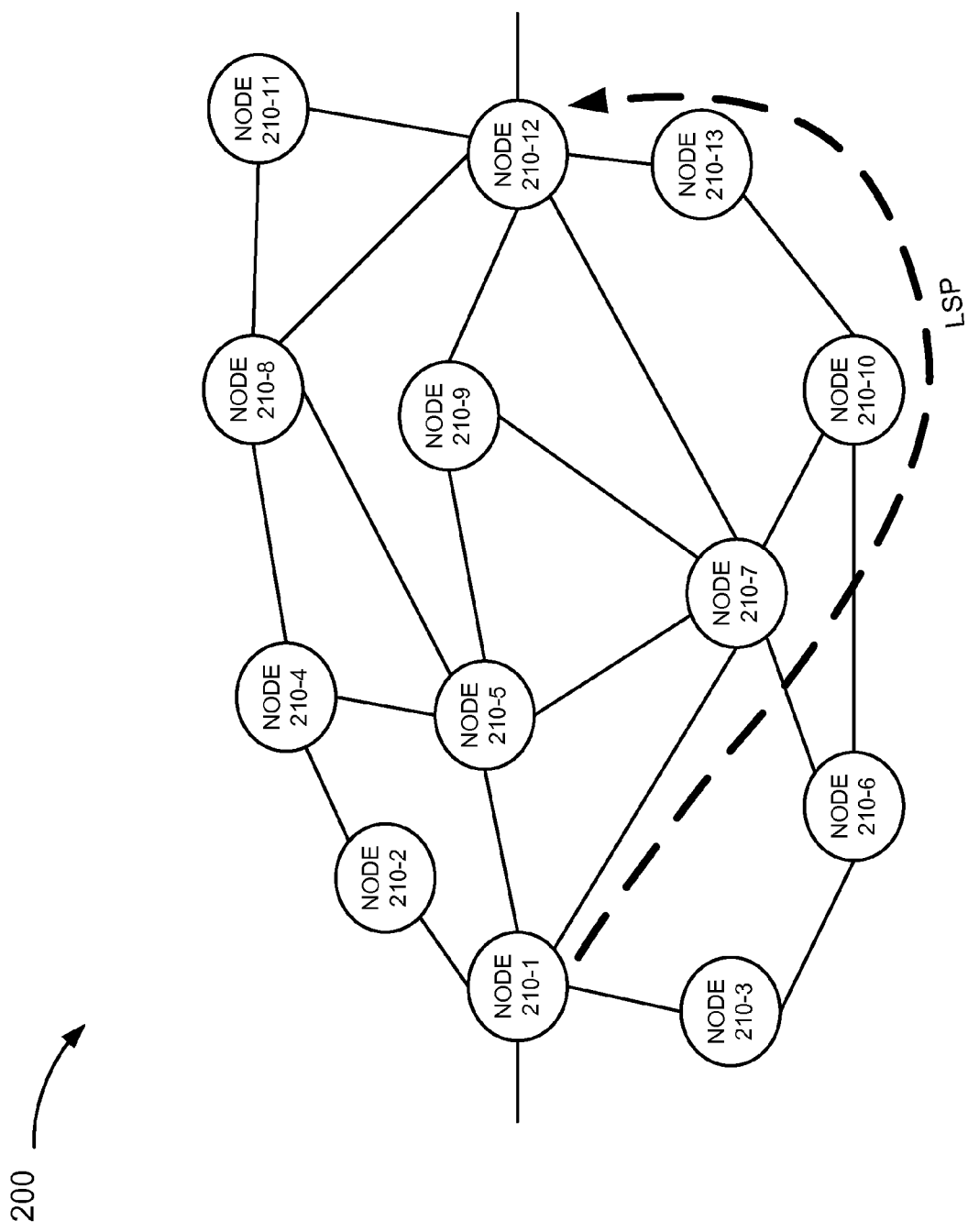
FIG. 2 is a diagram of an exemplary network in which systems and/or methods, described herein, may be implemented.

FIG. 2 is a diagram of an exemplary network 200 in which systems and/or methods, described herein, may be implemented. As shown in FIG. 2, network 200 may include nodes 210-1, 210-2, . . . , 210-13 (referred to collectively as "nodes 210," and individually as "node 210"). Nodes 210 may connect via a number of network links. The network links may be wired or wireless links. Each node 210 may connect to one or more other nodes 210. While FIG. 2 shows a particular number and arrangement of nodes 210, network 200 may include additional, fewer, different, or differently arranged nodes 210 than illustrated in FIG. 2.

Node 210 may include a device that transmits data traffic. Node 210 may take the form of a routing device, a switching device, a multiplexing device, or a device that performs routing, switching, and/or multiplexing functions. In one implementation, node 210 may be a digital device. In another implementation, node 210 may be an optical device. In yet another implementation, node 210 may be a combination of a digital device and an optical device.

Nodes 210 may be connected via digital channels (e.g., time-division multiplexing (TDM) channels) or optical channels (e.g., wave division multiplexed channels) and may collectively form an MPLS network. Nodes 210 may assign labels to packets and make forwarding decisions based on these labels. For example, a node 210 may add an MPLS header to a packet and include, in the MPLS header, one or more labels that are used to label switch the packet across network 200.

A path, called an LSP, may be set up through a set of nodes 210 in network 200. Typically, an LSP is unidirectional and carries packets from an ingress node (sometimes referred to as a "label edge router") to an egress node (sometimes also referred to as a "label edge router") via one or more intermediate nodes (sometimes referred to as "label switch routers"). The ingress node may push a label onto a packet. An intermediate node may perform a lookup operation based on the label and route the packet based on a result of the lookup operation. The intermediate node may also perform other operations based on the label, such as swap the label with another label, push a label (e.g., add another label to the packet), or pop the label (e.g., remove the label from the packet). The egress node may pop the label off the packet before forwarding the packet towards the packet's destination. For the LSP shown in FIG. 2, node 210-1 may correspond to the ingress node, nodes 210-7, 210-10, and 210-13 may correspond to intermediate nodes, and node 210-12 may correspond to the egress node.

Multiple LSPs may be set up in network 210. Some of these LSPs may share nodes 210. In other words, a particular node 210 may be part of two or more LSPs. The functions, performed by the particular node 210, may differ for different LSPs. For example, the particular node 210 may function as an intermediate node for one LSP and as an ingress or egress node for another LSP.

Figure 3:
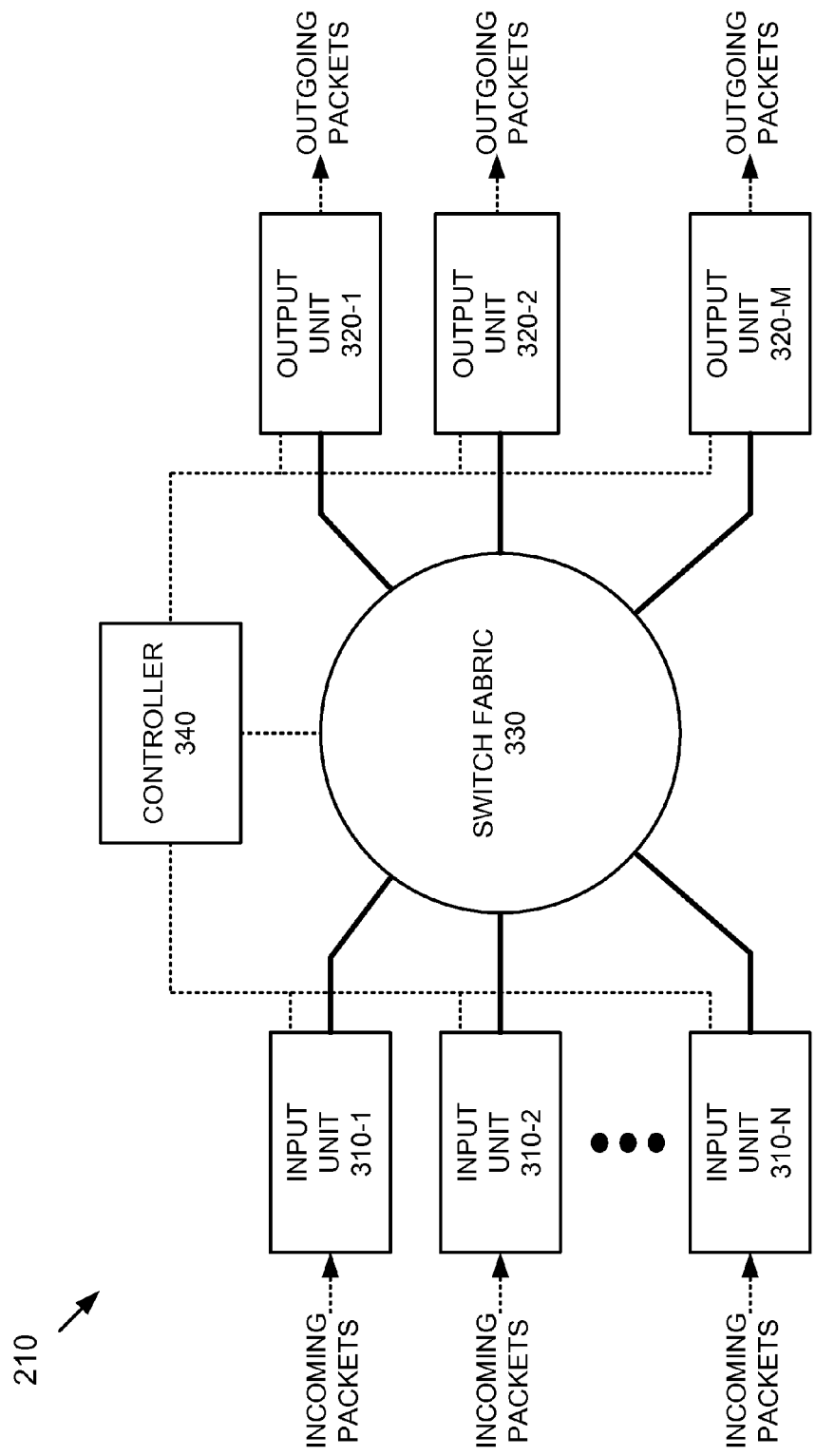
FIG. 3 is a diagram of exemplary components of a node of FIG. 2.

FIG. 3 is a diagram of exemplary components of a node 210. As shown in FIG. 3, node 210 may include input units 310-1, 310-2, . . . , 310-N (collectively referred to as "input units 310," and individually as "input unit 310") (where N≥1), output units 320-1, 320-2, . . . , 320-M (collectively referred to as "output units 320," and individually as "output unit 320") (where M≥1), a switch fabric 330, and a controller 340. In another implementation, node 210 may include fewer, additional, different, or differently arranged components than those illustrated in FIG. 3. Also, a function described as being performed by one of these components may be performed by another component in another implementation.

Input unit 310 may include a component or a collection of components to process incoming packets (i.e., packets received on network links). Input unit 310 may manage a port or a collection of ports via which packets can be received. Input unit 310 may perform certain operations on incoming packets, such as decapsulation, encapsulation, demultiplexing, multiplexing, queuing, etc. operations, that may facilitate the processing and/or transporting of the incoming packets by other components of node 210.

Output unit 320 may include a component or a collection of components to process outgoing packets (i.e., packets transmitted on network links). Output unit 320 may manage a port or a collection of ports via which packets can be transmitted. Output unit 320 may perform certain operations on outgoing packets, such as encapsulation, decapsulation, multiplexing, demultiplexing, queuing, prioritizing, etc. operations, that may facilitate the processing and/or transmission of the outgoing packets from node 210.

Switch fabric 330 may include one or more switching planes to facilitate communication among input units 310, output units 320, and/or controller 340. In one implementation, each of the switching planes may include a single or multi-stage switch of crossbar elements. Switch fabric 330 may also, or alternatively, include processors, memories, and/or paths that permit communication among input units 310, output units 320, and/or controller 340.

Controller 340 may include one or more processors, microprocessors, application specific integrated circuits (ASICs), field programming gate arrays (FPGAs), or the like that may be optimized for networking and communications. Controller 340 may also include static memory (e.g., a read only memory (ROM)), dynamic memory (e.g., a random access memory (RAM)), cache memory, and/or flash memory for storing data and/or machine-readable instructions.

Controller 340 may also communicate with other nodes 210 to exchange information regarding network topology and labels to facilitate the label switching of packets. Controller 340 may perform MPLS functions for node 210, such as label lookups, label popping, swapping, and/or pushing operations, routing decisions, etc. Controller 340 may also determine when network congestion exists and instruct one or more output units 320 to add congestion notification indicators to LDP packets transmitted via certain output ports.

Figure 4A:
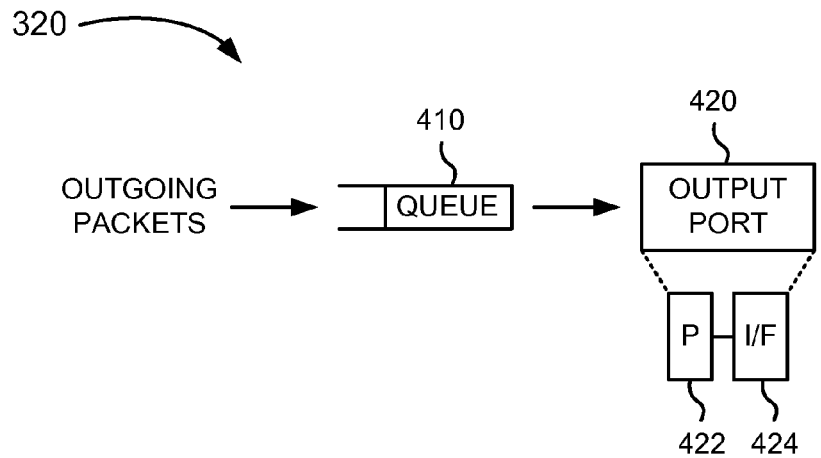
FIG. 4A is a diagram of one exemplary implementation of a portion of an output unit of FIG. 3.

FIG. 4A is a diagram of one exemplary implementation of a portion of an output unit 320. As shown in FIG. 4A, output unit 320 may include a queue 410 and an output port 420. In another implementation, output unit 320 may include additional or different components than are illustrated in FIG. 4A.

Queue 410 may include a storage device that temporarily stores outgoing packets for transmission from node 210. In one implementation, queue 410 may store all packets to be transmitted via output port 420. In this particular implementation, there may be no notion of priority for outgoing packets. For example, packets may be processed in a first-in, first-out basis. Traffic congestion may exist when packets get dropped from queue 410. Packets may get dropped when packets are added to queue 410 at a faster rate than packets are outputted from queue 410.

Output port 420 may include processing logic 422 and an interface 424. Processing logic 422 may determine when traffic congestion exists, may modify LDP packets to include indicators of traffic congestion, and/or may transmit outgoing packets via interface 424. Interface 424 may include a physical interface to a network link. In one implementation, the physical interface may correspond to an optical interface, an Ethernet interface, or another type of network interface. In another implementation, interface 424 may include a logical interface. A logical interface may correspond to a single physical interface, a portion of a single physical interface, or a combination of multiple, physical interfaces.

Figure 4B:
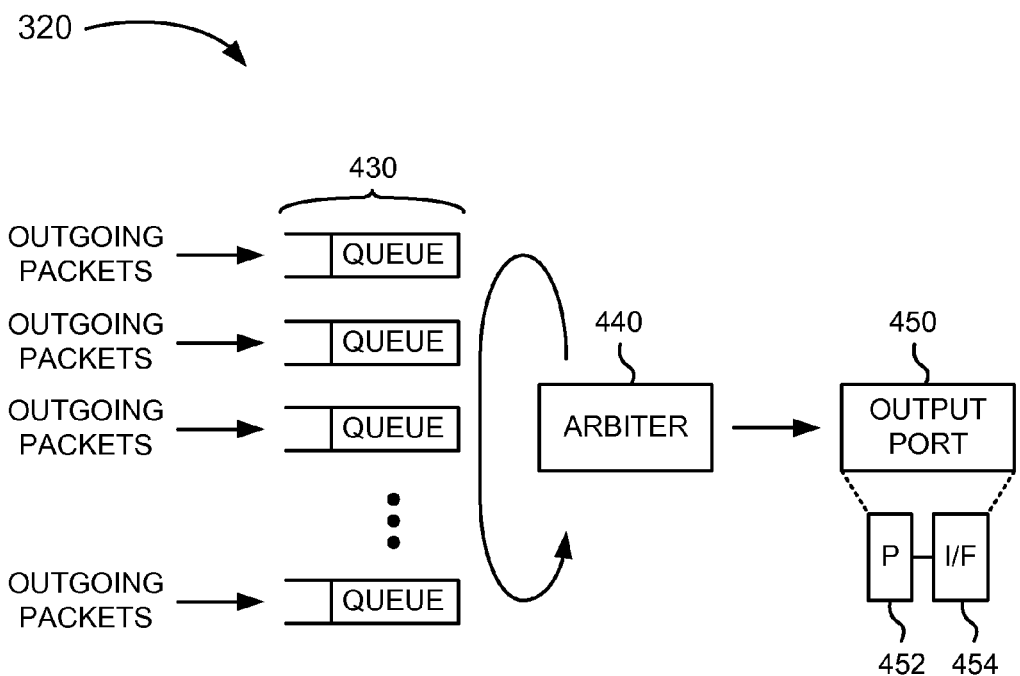
FIG. 4B is a diagram of another exemplary implementation of a portion of an output unit of FIG. 3.

FIG. 4B is a diagram of another exemplary implementation of a portion of an output unit 320. As shown in FIG. 4B, output unit 320 may include a set of queues 430, an arbiter 440, and an output port 450. In another implementation, output unit 320 may include additional or different components than are illustrated in FIG. 4B.

Queues 430 may include a storage device, or a group of storage devices, that temporarily stores outgoing packets for transmission from node 210. In one implementation, each of queues 430 may store packets of a particular class, priority, type, traffic flow, etc. For example, one of queues 430 may store traffic that is traffic engineering capable (e.g., RSVP-TE traffic) and another one of queues 430 may store traffic that is not traffic engineering capable (e.g., LDP traffic). Alternatively, or additionally, a particular one of queues 430 may store packets associated with traffic corresponding to a first LSP, and another particular one of queues 430 may store packets associated with traffic corresponding to a second LSP. Traffic congestion may exist when packets get dropped from one of queues 430. Packets may get dropped when packets are added to a particular queue 430 at a faster rate than packets are outputted from the particular queue 430.

Arbiter 440 may include a component that arbitrates among queues 430 to select one of queues 430 from which to dequeue a packet Arbiter 440 may use an arbitration scheme, such as a round robin scheme, a weighted round robin scheme, etc., to select one of queues 430 from which to dequeue a packet.

Output port 450 may include processing logic 452 and an interface 454. Processing logic 452 may determine when traffic congestion exists, may modify LDP packets to include indicators of traffic congestion, and/or may transmit outgoing packets via interface 454. Interface 454 may include a physical interface to a network link. In one implementation, the physical interface may correspond to an optical interface, an Ethernet interface, or another type of network interface. In another implementation, interface 454 may include a logical interface. As described above, a logical interface may correspond to a single physical interface, a portion of a single physical interface, or a combination of multiple, physical interfaces.

Nodes 210 may transmit LSP traffic on a network link connected to output port 420/450 of an output unit 320. Each network link may have a certain amount of bandwidth to carry network traffic, such as LSP traffic.

Figure 5:
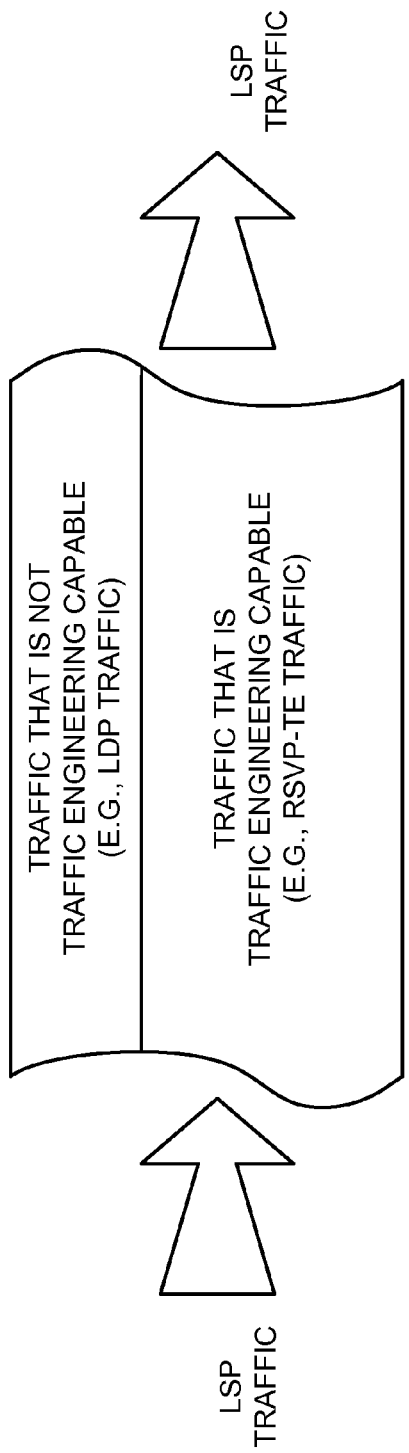
FIG. 5 is a diagram of LSP traffic that may be transmitted on a network link.

FIG. 5 is a diagram of LSP traffic that may be transmitted on a network link. As shown in FIG. 5, LSP traffic may simultaneously include traffic that is traffic engineering capable (referred to as "TE traffic") (e.g., RSVP-TE traffic) and traffic that is not traffic engineering capable (referred to as "NTE traffic") (e.g., LDP traffic). The TE traffic may utilize a known amount of bandwidth. The particular amount of bandwidth, used by the TE traffic, may be known via signaling and can change over time with appropriate signaling. The NTE traffic, however, may utilize an unknown amount of bandwidth that can change without any notice. Because the amount of bandwidth used by the NTE traffic can change without notice, traffic congestion can occur when the amount of bandwidth used by the TE and NTE traffic exceeds the bandwidth available to the LSP.

Figure 6:
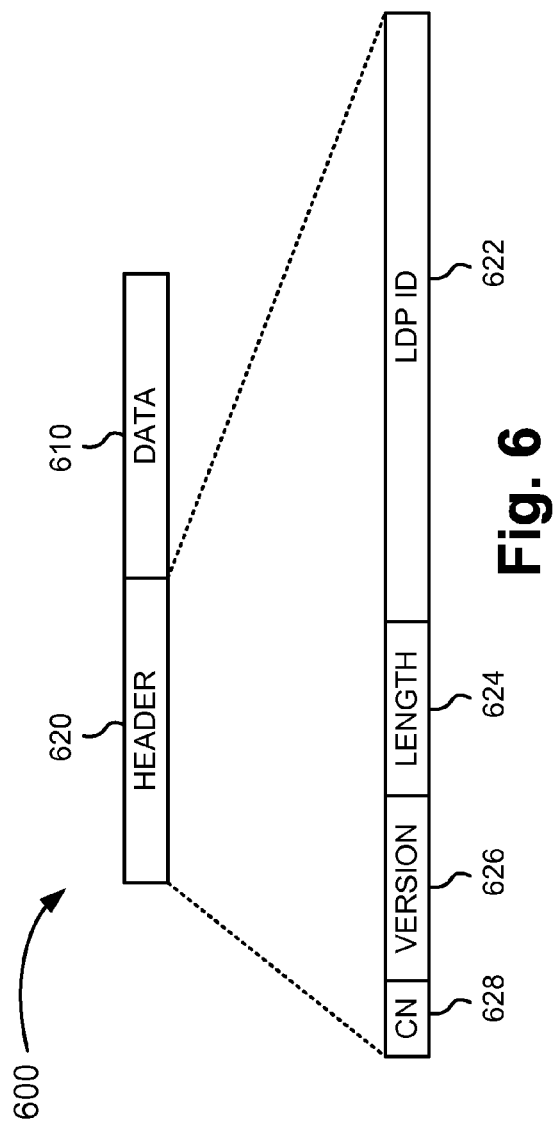
FIG. 6 is a diagram of an exemplary LDP packet.

The NTE traffic, as described above, may include LDP packets. FIG. 6 is a diagram of an exemplary LDP packet 600. As shown in FIG. 6, LDP packet 600 may include a data portion 610 and a header portion 620. In another implementation, LDP packet 600 may include additional portions than are shown in FIG. 6.

Data portion 610 may store the payload or data of one or more LDP messages. Header portion 620 may include an LDP identifier field 622, a length field 624, a version field 626, and a congestion notification (CN) field 628. In another implementation, header portion 620 may contain fewer, additional, different, or differently arranged fields than are shown in FIG. 6. For example, header portion 620 may also include information identifying the egress node, such as an Internet protocol (IP) and/or virtual private network (VPN) address of the egress node.

LDP identifier field 622 may store a unique identifier associated with the label space of a sending node 210. For example, LDP identifier field 622 may store both a unique identifier of the sending node 210 and an identifier of a label space within the sending node 210. Alternatively, or additionally, LDP identifier field 622 may store a label or a label stack that may be used to label switch LDP packet 600. One or more of the labels may include information that identifies an identity of a next hop node and/or the egress node.

Length field 624 may store information identifying the length of LDP packet 600. In one implementation, the length of LDP packet 600 may take into account the length of all of the fields of LDP packet 600 other than length field 624 and version field 626. In another implementation, the length of LDP packet 600 may be calculated in another way. Version field 626 may store information identifying a version of the LDP used for LDP packet 600. CN field 628 may store information as an indicator of whether traffic congestion has been detected. In one implementation, CN field 628 may store a single bit as the indicator of traffic congestion. For example, the bit may be set to indicate that traffic congestion exists and reset to indicate that traffic congestion does not exist. As described herein, an egress node may use the information in CN field 628 to determine whether to notify the ingress node of congestion on the LSP.

Figure 7:
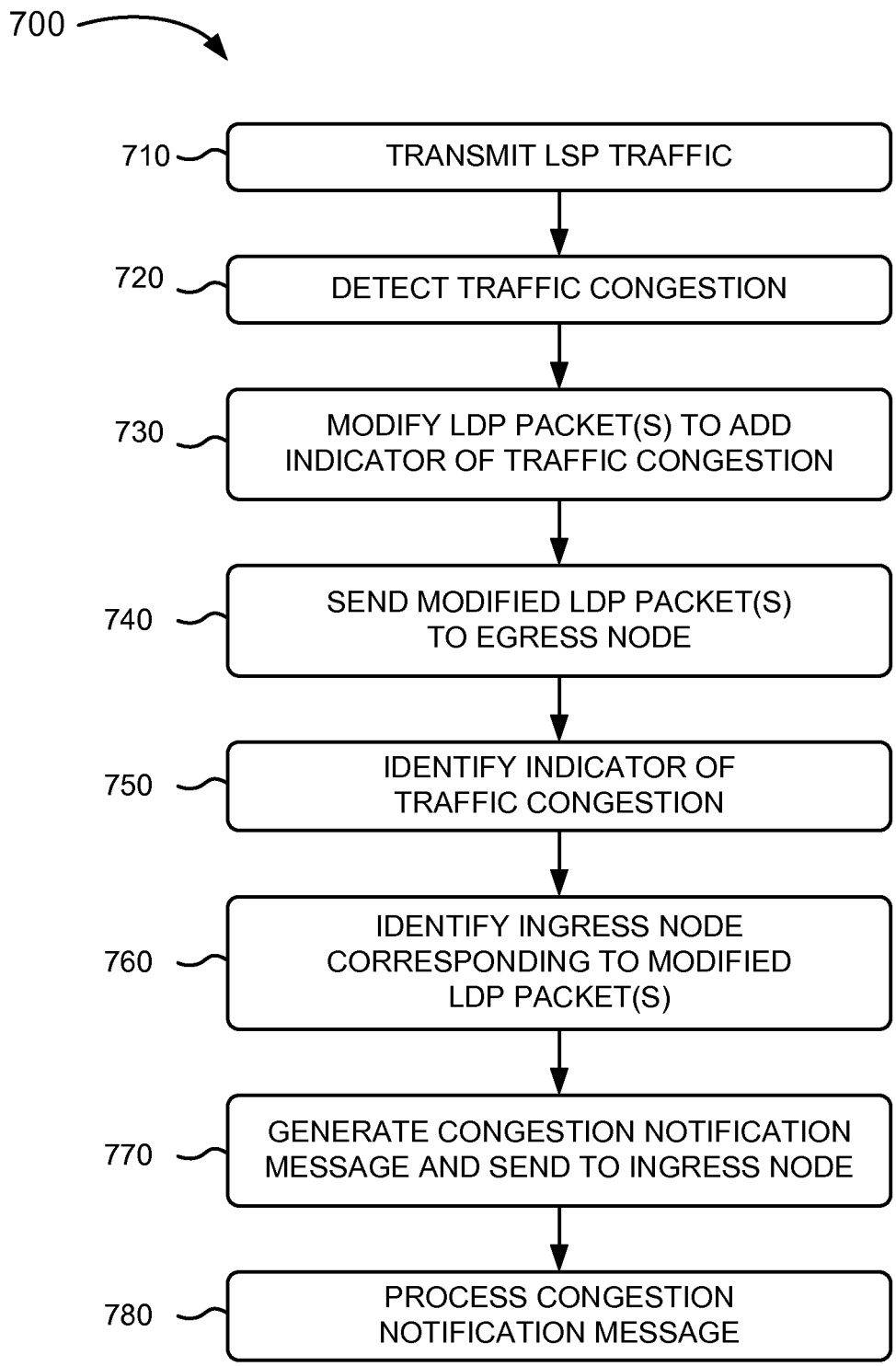
FIG. 7 is a flowchart of an exemplary process for providing congestion notification.

FIG. 7 is a flowchart of an exemplary process 700 for providing congestion notification. In one implementation, process 700 may be performed by one or more nodes 210 in network 200. In another implementation, one or more blocks, of process 700, may be performed by a device separate from nodes 210, such as a controller device in communication with nodes 210. Process 700 will be described in connection with FIGS. 8A-8E. FIGS. 8A-8E are diagrams of an example of providing congestion notification.

Figure 8A:
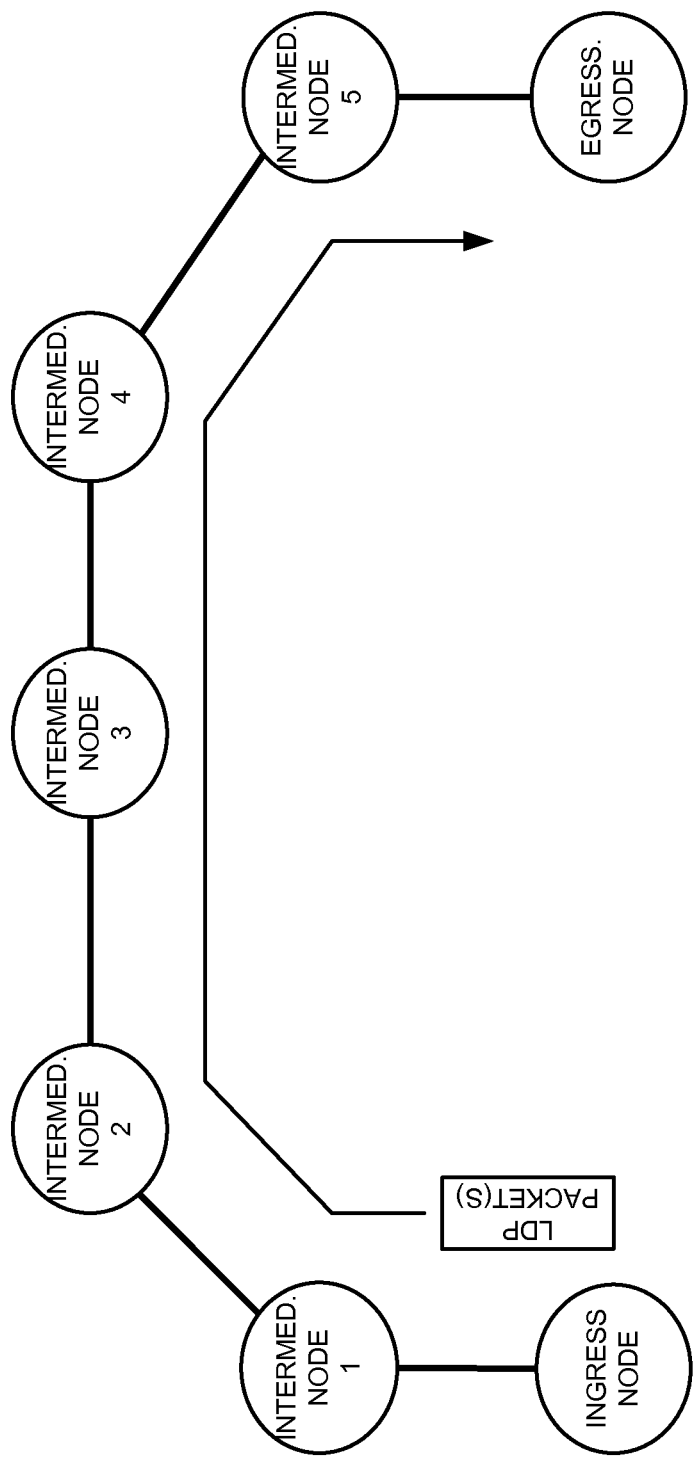
FIGS. 8A-8E are diagrams of an example of providing congestion notification.

Process 700 may include transmitting LSP traffic (block 710). For example, an LSP may be formed from an ingress node to an egress node via one or more intermediate nodes. As shown in FIG. 8A, assume that an LSP is formed and includes the ingress node, the egress node, and intermediate nodes 1-5. The LSP may be formed by transmitting and/or exchanging labels among the nodes. The ingress node may transmit data traffic on the LSP. The data traffic may include TE traffic (i.e., traffic that is traffic engineering capable) and NTE traffic (i.e., traffic that is not traffic engineering capable). As shown in FIG. 8A, assume that the NTE traffic includes LDP packets.

Figure 8B:
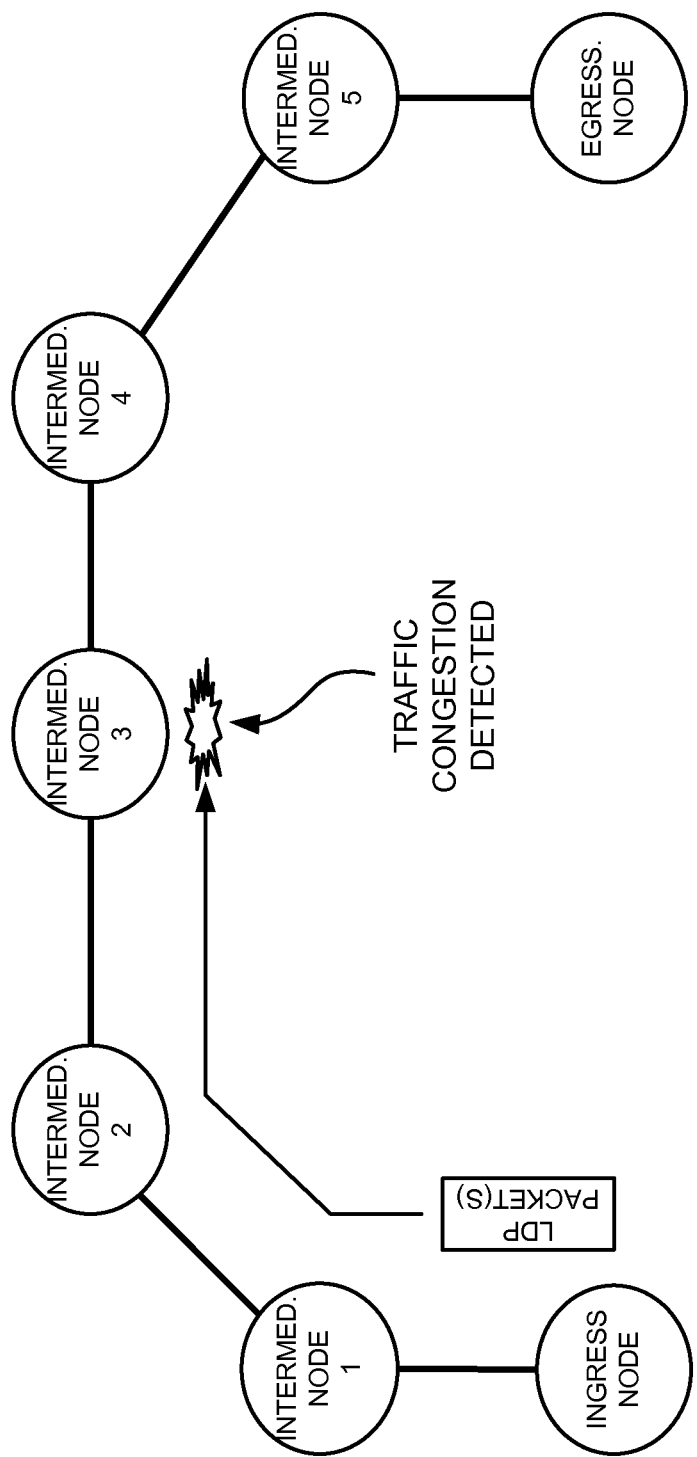

Traffic congestion may be detected (block 720). For example, assume that the bandwidth, used by the LSP traffic, exceeds the bandwidth available to the LSP on the network links connecting the nodes on the LSP. Thus, an intermediate node (e.g., intermediate node 3) may detect traffic congestion, as shown in FIG. 8B. For example, due to the LSP traffic using more than the available bandwidth, intermediate node 3 may begin to drop packets. This may occur when the rate at which packets are stored in a queue (e.g., queue 410/430), associated with the LSP, exceeds the rate at which packets are dequeued from the queue.

Figure 8C:
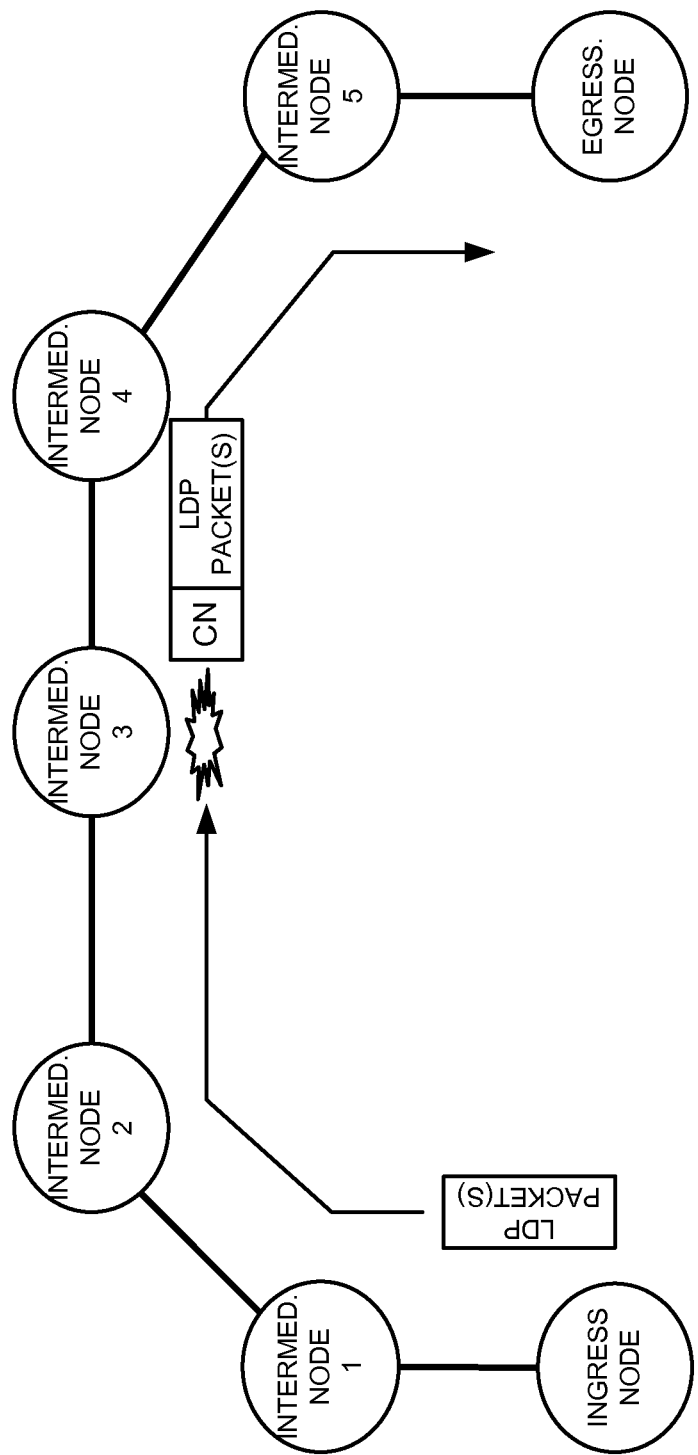

LDP packet(s) may be modified to add an indicator of traffic congestion (block 730). For example, intermediate node 3 (e.g., the intermediate node that detected the traffic congestion) may store an indicator of the traffic congestion in CN field 628 of an LDP packet associated with the LSP for which traffic congestion was detected, as shown in FIG. 8C. In one implementation, intermediate node 3 may store the indicator of traffic congestion in a single LDP packet associated with the LSP. In another implementation, intermediate node 3 may store the indicator of traffic congestion in multiple LDP packets associated with the LSP. This may be beneficial in case one or more of the LDP packets gets dropped by an upstream node.

The modified LDP packet(s) may be sent to the egress node (block 740). For example, intermediate node 3 may transmit the modified LDP packet(s) (e.g., the LDP packet(s) that have been modified to include the indicator of traffic congestion) on the LSP toward the egress node, as shown in FIG. 8C. As shown in FIG. 8C, intermediate node 4 may receive the modified LDP packet(s) and transmit the modified LDP packet(s) to the next hop node (e.g., intermediate node 5). As further shown in FIG. 8C, intermediate node 5 may receive the modified LDP packet(s) and transmit the modified LDP packet(s) to the next hop node (e.g., the egress node).

The indicator of traffic congestion may be identified (block 750). For example, the egress node may receive a modified LDP packet of the modified LDP packet(s) output by intermediate node 3. The egress node may remove and/or read the header portion (e.g., header portion 620 (FIG. 6)) of the modified LDP packet. The egress node may read, for example, CN field 628, and determine that CN field 628 stores information that indicates that traffic congestion exists. The egress node may also identify the LSP with which the modified LDP packet is associated based on, for example, information in LDP identifier field 622.

The ingress node corresponding to the modified LDP packet(s) may be identified (block 760). For example, when the egress node determines that traffic congestion exists with regard to a particular LSP, the egress node may identify the ingress node associated with the LSP. The egress node may store, in memory, information that identifies the ingress nodes associated with LSPs for which the egress node is the egress node. In other words, for any LSP for which the egress node is an egress node, the egress node may know the identity of the ingress node for the LSP.

Figure 8D:
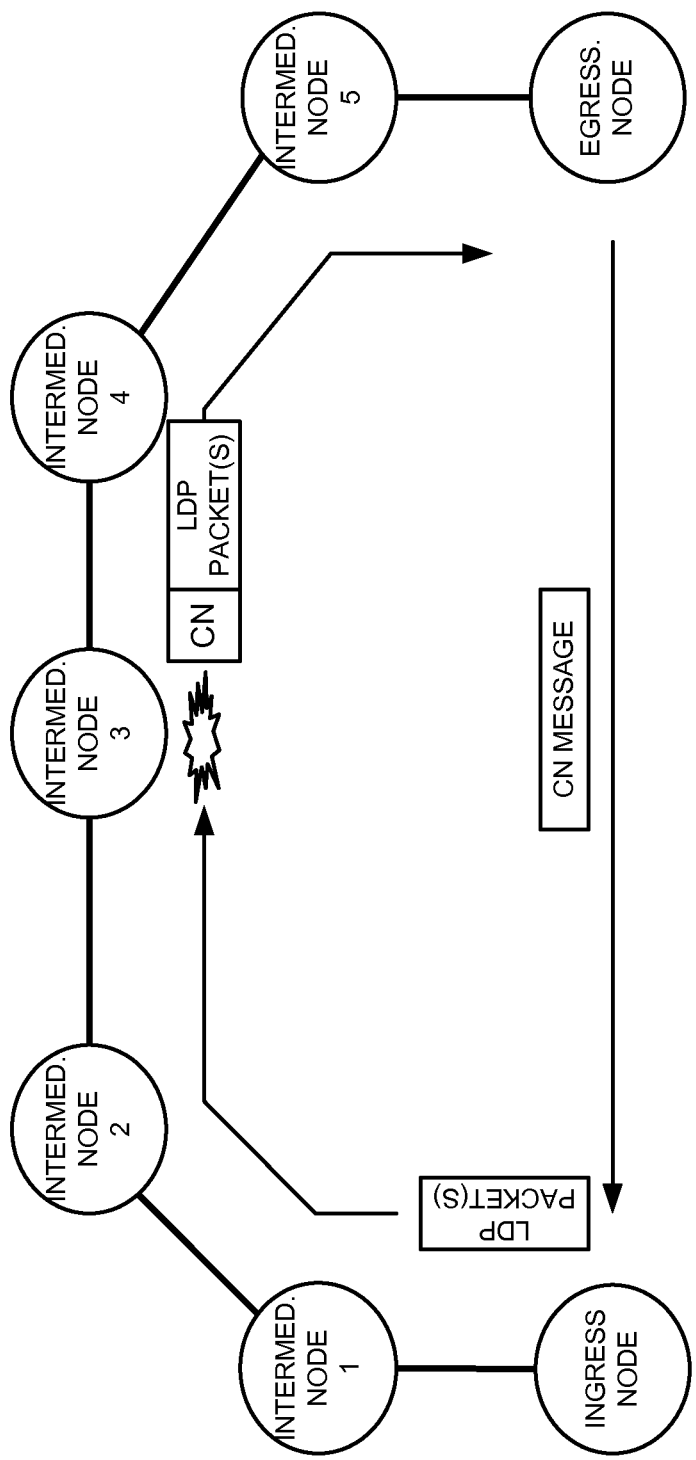

A congestion notification message may be generated and sent to the ingress node (block 770). For example, the egress node may generate a congestion notification message and identify, within the congestion notification message, the LSP on which the traffic congestion was detected. The egress node may send the congestion notification message to the ingress node, as shown in FIG. 8D. In one implementation, the egress node may send the congestion notification message via the same path as the LSP for which traffic congestion was detected. In another implementation, the egress node may send the congestion notification message via another path, which is different from the LSP. In yet another implementation, the egress node may send the congestion notification message via a path that partially overlaps with the LSP.

The congestion notification message may be processed (block 780). For example, the ingress node may receive the congestion notification message and may determine, from the congestion notification message, that traffic congestion exists on a particular LSP. The ingress node may determine how to handle the traffic congestion based on one or more factors. One factor, for example, may relate to whether it would be detrimental to lose data traffic on the LSP. For example, if the LSP is carrying high priority data traffic, such as video or audio data, then the ingress node may determine that it would be detrimental to lose data traffic on the LSP. If, on the other hand, the LSP is carrying best effort data traffic, then the ingress node may determine that it would not be detrimental to lose data traffic on the LSP.

In one implementation, the ingress node may choose to do nothing in response to determining that traffic congestion exists on a particular LSP. In this case, packets, on the particular LSP, may be dropped by one or more nodes on the LSP.

Figure 8E:
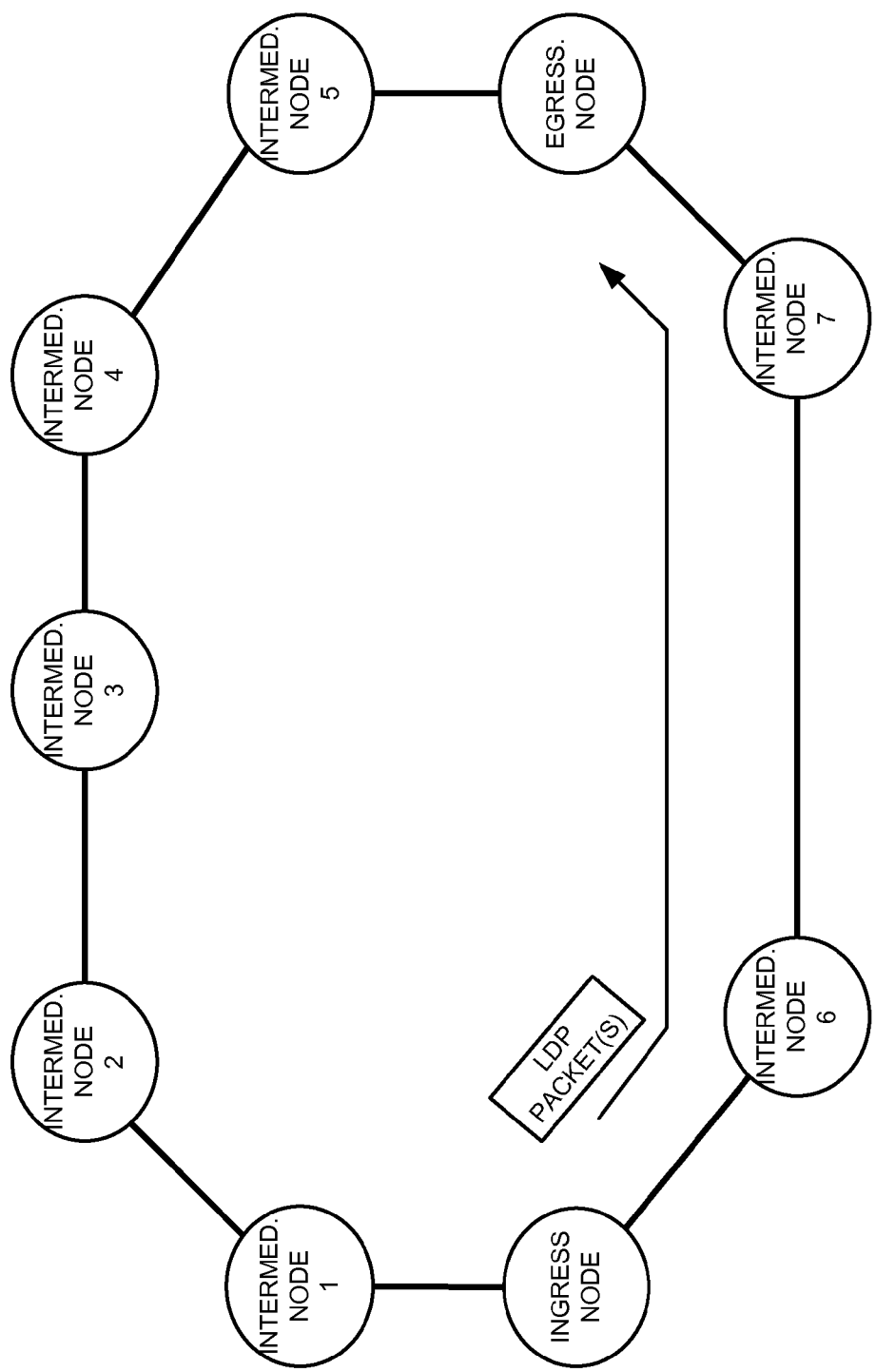

In another implementation, the ingress node may choose to pre-empt the LDP traffic flow (e.g., LDP packets associated with the LSP). In this case, the ingress node may determine another path on which to transmit the LDP traffic flow. For example, the ingress node may perform a shortest path calculation to identify a new path for the LDP traffic flow. As shown in FIG. 8E, for example, assume that the ingress node has identified the new path as connecting the ingress node to the egress node via intermediate nodes 6 and 7. The ingress node may then set up a new LSP on the identified path by transmitting and/or exchanging labels in the event that an LSP does not already exist on the identified path. Thereafter, the ingress node may transmit LDP packets, associated with that LDP traffic flow, on the new LSP, as shown in FIG. 8E.

Although not shown in FIGS. 8A-8E, data traffic, associated with multiple LSPs, may be transmitted via the same output port (e.g., output port 420/450) of an intermediate node. One or more of these LSPs may be associated with different egress nodes. If the intermediate node detects traffic congestion associated with a particular output port (e.g., output port 420/450) (e.g., due to packets being dropped), the intermediate node may modify LDP packets (e.g., modify the LDP packets to include indicators of traffic congestion) associated with multiple LSPs and send these modified LDP packets to different egress nodes. Each of these different egress nodes may process the modified LDP packets and notify an ingress node of the traffic congestion, as described above.

An implementation, described herein, may provide a notification of traffic congestion by modifying one or more packets associated with data traffic that is not traffic engineering capable to include an indicator of the traffic congestion. An egress node, that receives a packet with an indicator of the traffic congestion, may send a notification to an ingress node so that the ingress node may determine whether to pre-empt the data traffic that is not traffic engineering capable.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 7, the order of the blocks may be modified in other implementations. Further, non-dependent blocks may be performed in parallel.

Also, the term "packet," as used herein, is intended to refer to any form or arrangement of data, whether in packet form or in non-packet form.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as an ASIC or FPGA, or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
setting up a label switched path (LSP) from an ingress node to an egress node via one or more intermediate nodes,
the LSP carrying traffic that is traffic engineering capable (TE traffic) and traffic that is not traffic engineering capable (NTE traffic);
detecting, by one of the one or more intermediate nodes, traffic congestion associated with the LSP;
modifying, by the one of the one or more intermediate nodes, one or more packets, associated with the NTE traffic, to create one or more modified packets that include an indicator of the traffic congestion;
sending, by the one of the one or more intermediate nodes, the one or more modified packets towards the egress node;
receiving, by the egress node, the one or more modified packets;
identifying, by the egress node, the indicator of the traffic congestion within the one or more modified packets;
generating, by the egress node and based on identifying the indicator of the traffic congestion, a congestion notification message that identifies the LSP traversed by the packet; and
sending, by the egress node, the congestion notification message to the ingress node to notify the ingress node of the traffic congestion associated with the LSP;
receiving, by the ingress node, the congestion notification message;
determining, by the ingress node and based on the congestion notification message, that the traffic congestion exists on the LSP;
determining, by the ingress node and after determining that the traffic congestion exists on the LSP, that the NTE traffic is high priority traffic;
identifying, by the ingress node, another LSP for the NTE traffic after determining that the NTE traffic is high priority traffic; and
sending, by the ingress node, one or more other packets, associated with the NTE traffic, via the other LSP.

2. The method of claim 1,
where the one or more packets associated with the NTE traffic include one or more label distribution protocol (LDP) packets, and
where modifying the one or more packets includes:
modifying the one or more LDP packets to include the indicator, of the traffic congestion, in a header of each of the one or more LDP packets to create the one or more modified packets.

3. The method of claim 1, where detecting the traffic congestion includes:
determining that at least one packet has been dropped by the one or more intermediate nodes, and
detecting the traffic congestion based on the at least one packet being dropped.

4. The method of claim 1, where modifying the one or more packets includes:
modifying a plurality of packets, of the one or more packets, to include the indicator of the traffic congestion.

5. The method of claim 1, where identifying the indicator of the traffic congestion includes:
reading information from a header of a particular packet of the one or more modified packets, and
determining that the information, read from the header, includes the indicator of the traffic congestion.

6. The method of claim 1, where identifying the other LSP includes:
performing a shortest path calculation to identify a new path from the ingress node to the egress node.

7. The method of claim 6, further comprising:
setting up the other LSP from the ingress node to the egress node via the new path,
the sending of the one or more other packets including:
moving the NTE traffic from the LSP to the other LSP.

8. The method of claim 1, further comprising:
receiving, by the ingress node, another congestion notification message associated with a different LSP;
determining that the different LSP is carrying other traffic that is not high priority traffic; and
leaving the other traffic on the different LSP, without moving the other traffic after determining that the different LSP is carrying the other traffic that is not high priority traffic.

9. A system comprising:
an ingress node;
an egress node; and
an intermediate node to:
detect traffic congestion associated with a label switched path (LSP),
a label switched path (LSP) being formed from an ingress node to the egress node via the intermediate node,
the LSP carrying traffic that is not traffic engineering capable, and
the traffic that is not traffic engineering capable including label distribution protocol (LDP) packets,
modify a particular packet of the LDP packets, associated with the traffic that is not traffic engineering capable, to include an indicator of the traffic congestion,
send the particular packet towards the egress node,
the egress node being to:
receive the particular packet,
identify the indicator of the traffic congestion within the particular packet,
generate, based on the indicator of the traffic congestion, a congestion notification message that identifies the LSP associated with the particular packet, and
send the congestion notification message to the ingress node to notify the ingress node of the traffic congestion, and the ingress node being to:
receive the congestion notification message,
determine, based on the congestion notification message, that the traffic congestion exists on the LSP,
determine, after determining that the traffic congestion exists on the LSP, that the traffic being carried on the LSP is high priority traffic,
identify another LSP for the traffic after determining that the traffic being carried on the LSP is high priority traffic, and
send one or more other packets of the LDP packets via the other LSP.

10. The system of claim 9, where the LSP simultaneously carries the traffic that is not traffic engineering capable and traffic that is traffic engineering capable.

11. The system of claim 9,
where a header of the particular packet includes the indicator of the traffic congestion,
where the indicator of the traffic congestion is set to a first value to indicate that traffic congestion exists, and where the first value is different from a second value that is used to indicate that no traffic congestion exists.

12. The system of claim 9, where, when detecting the traffic congestion, the intermediate node is to:
determine that at least one packet has been dropped, and
detect the traffic congestion based on the at least one packet being dropped.

13. The system of claim 9, where, when modifying the particular packet, the intermediate node is to:
modify a plurality of the LDP packets to include the indicator of the traffic congestion,
the plurality of the LDP packets including the particular packet.

14. The system of claim 9, where the intermediate node is further to:
modify a different LDP packet associated with a different LSP after detecting the traffic congestion, and
send the different LDP packet to a different egress node,
the different egress node being associated with the different LSP.

15. The system of claim 9, where, when sending the one or more other packets, the ingress node is to:
move the traffic that is not traffic engineering capable to the other LSP.

16. The system of claim 9, where, when identifying the other LSP, the ingress node is to:
perform a shortest path calculation to identify a new path from the ingress node to the egress node, and
identify the other LSP based on the new path.

17. The system of claim 9, where, when sending the congestion notification message to the ingress node, the egress node is to:
send the congestion notification message to the ingress node via one or more nodes that are different from the intermediate node traversed by the particular packet.

18. A system comprising:
an egress node to:
receive, from an intermediate node and via a label switched path (LSP), a modified label distribution protocol (LDP) packet that has been modified by the intermediate node,
the LSP carrying LDP packets of an LDP traffic flow, and
the LDP packets including the modified LDP packet,
determine that the modified LDP packet indicates that traffic congestion exists based on first information included in a first field of a header of the modified LDP packet,
determine that the LSP is associated with the modified LDP packet based on second information included in a second field of the header of the modified LDP packet,
generate a congestion notification message based on the first information and the second information, and
send the congestion notification message; and
an ingress node to:
receive the congestion notification message,
identify, based on the congestion notification message, that the traffic congestion exists on the LSP,
the LSP connecting the ingress node to the egress node via the intermediate node,
determine, after identifying that the traffic congestion exists on the LSP, that the LDP packets are associated with high priority traffic,
identify another LSP after determining that the LDP packets are associated with high priority traffic, and
send one or more other packets of the LDP packets via the other LSP.

19. The system of claim 18,
where the first information in the first field is set to a first value to indicate that the traffic congestion exists, and
where the first value is different from a second value that is used to indicate that no traffic congestion exists.

20. The system of claim 18, where the LSP simultaneously carries the LDP traffic flow and a traffic flow that is traffic engineering capable.

21. The system of claim 18,
where the intermediate node connects to another egress node via another LSP, and
where the other LSP carries separate LDP packets of another LDP traffic flow.

22. The system of claim 18, where, when identifying the other LSP, the ingress node is to:
perform a shortest path calculation to identify a new path between the ingress node and the egress node,
determine that the other LSP already exists on the new path.

* * * * *